United States Patent [19]

Seitz et al.

[11] Patent Number: 5,176,985
[45] Date of Patent: Jan. 5, 1993

[54] REACTION PRODUCT, PREPARATION THEREOF AND RADIATION-SENSITIVE MATERIAL OBTAINED THEREWITH

[75] Inventors: Friedrich Seitz, Friedelsheim; Erich Beck, Harthausen; Joachim Roser, Ludwigshafen; Guenther Schulz, Bad Duerkheim; Eleonore Bueschges, Mannheim; Thomas Zwez, Karlsruhe, all of Fed. Rep. of Germany

[73] Assignee: BASF Aktiengesellschaft, Ludwigshafen, Fed. Rep. of Germany

[21] Appl. No.: 561,901

[22] Filed: Aug. 2, 1990

[30] Foreign Application Priority Data

Aug. 22, 1989 [DE] Fed. Rep. of Germany ....... 3927632

[51] Int. Cl.⁵ ............... G03F 7/031; G03F 7/027; G03F 7/038; C08G 8/00
[52] U.S. Cl. ............... 430/284; 522/97; 526/301; 526/263; 528/68; 528/75; 528/73
[58] Field of Search ............... 430/284; 522/97; 526/301, 263; 528/68, 75, 73

[56] References Cited

U.S. PATENT DOCUMENTS

| | | |
|---|---|---|
| 3,779,778 | 12/1973 | Smith et al. . |
| 3,991,033 | 11/1976 | Sam . |
| 4,009,040 | 2/1977 | Nebe . |
| 4,029,505 | 6/1977 | Nebe . |
| 4,086,210 | 4/1978 | Petropoulos . |
| 4,162,274 | 7/1979 | Pilz . |
| 4,189,611 | 2/1980 | Sam . |
| 4,198,242 | 4/1980 | Pazos . |
| 4,228,232 | 10/1980 | Rousseau et al. . |
| 4,248,957 | 2/1981 | Sander et al. . |
| 4,269,933 | 5/1981 | Pazos . |
| 4,304,923 | 12/1981 | Rousseau et al. . |
| 4,358,354 | 11/1982 | Iida et al. . |
| 4,366,230 | 12/1982 | Ahne et al. ............ 430/296 X |
| 4,368,253 | 1/1983 | Green et al. . |
| 4,371,685 | 2/1983 | Ahne et al. ............ 430/296 X |
| 4,415,652 | 11/1983 | Proskow . |
| 4,469,774 | 9/1984 | Lee . |
| 4,481,281 | 11/1984 | Tsao et al. ............ 430/284 |
| 4,491,628 | 1/1985 | Ito et al. . |
| 4,506,006 | 3/1985 | Ruckert . |
| 4,603,101 | 7/1986 | Crivello . |
| 4,673,705 | 6/1987 | Ansel et al. ............ 526/301 X |
| 4,690,501 | 9/1987 | Zimmerman et al. ........ 350/96.29 |
| 4,690,502 | 9/1987 | Zimmerman et al. ........ 350/96.29 |
| 4,712,740 | 1/1988 | Hung et al. ............ 522/96 |
| 4,786,577 | 11/1988 | Aoai et al. . |

FOREIGN PATENT DOCUMENTS

| | | |
|---|---|---|
| 0062474 | 10/1982 | European Pat. Off. . |
| 0099949 | 2/1984 | European Pat. Off. . |
| 0103197 | 3/1984 | European Pat. Off. . |
| 0130599 | 8/1988 | European Pat. Off. . |
| 0106156 | 12/1988 | European Pat. Off. . |
| 86-06730 | 11/1986 | PCT Int'l Appl. . |

*Primary Examiner*—Cynthia Hamilton
*Attorney, Agent, or Firm*—Keil & Weinkauf

[57] ABSTRACT

A reaction product useful for preparing radiation-sensitive materials, in particular materials whose solubility in water or aqueous alkali increases on irradiation, contains urea and urethane groups and also carboxyl groups and is obtained by reaction of i) an ethylenically monounsaturated or polyunsaturated mono- or polyalcohol with
ii) a di- or polyisocyanate,
iii) at least one amino compound and
iv) at least one anhydride of an at least dibasic carboxylic acid, the number of NCO and anhydride groups in ii) and iv) being equal to or less than the number of groups in i) and iii) which are reactive therewith.

22 Claims, No Drawings

REACTION PRODUCT, PREPARATION THEREOF AND RADIATION-SENSITIVE MATERIAL OBTAINED THEREWITH

The present invention relates to an ethylenically unsaturated carboxyl-containing reaction product which contains urea and urethane groups, to processes for preparing same and also to a radiation-sensitive material obtainable therewith. More particularly, the present invention relates to those radiation-sensitive mixtures which on irradiation become more soluble in water or aqueous alkali.

Positive-working light-sensitive compositions, i.e. compounds or mixtures of compounds whose solubility in a given solvent increases on irradiation, are known per se. The compounds most frequently used in reproduction technology are naphthoquinonediazides and derivatives thereof (cf. W. Fraß, Chemie in unserer Zeit, 17 (1983), 10; H. W. Vollmann, Angew. Chem. 92 (1980) 95). On irradiation, these compounds eliminate nitrogen and undergo a Wolff rearrangement which converts a hydrophobic diazoketone unit into a carboxyl group which renders the compounds mentioned, or mixtures prepared from these compounds, soluble in aqueous alkali.

A further class of compounds which are suitable for preparing positive-working light-sensitive mixtures are aromatic or heteroaromatic nitro compounds. Whereas the above-described compounds with a diazoketone structure are usually present in light-sensitive mixtures as low molecular weight compounds, light-sensitive nitro compounds can be used not only in the form of low molecular weight compounds (DE-A-22 07 574), U.S. Pat. No. 4,181,531) but also as polymers formed from monomers having an o-nitrocarbinol ester structure or copolymers of these monomers with other vinyl compounds (cf. DE-A-21 50 691, DE-A-29 22 746 and EP-A-19 770). Here too irradiation results in the formation of a carboxyl group which increases the solubility of the mixtures in aqueous alkali.

A similar principle appears to be at work with the positive systems which are described for example in U.S. Pat. No. 4,469,774 and which contain photochemically cleavable benzoin esters in the side chain.

A further instance of solubilization due to carboxyl groups is described for example in EP-A-62 474, EP-A-99 949 or U.S. Pat. No. 4,415,652. The mixture contains a water-insoluble binder, a mercaptocarboxylic acid and an initiator system which forms free radicals on irradiation. Irradiation causes a free radical graft of the mercaptocarboxylic acid onto the binder, thereby rendering the latter soluble in aqueous alkali.

In photosensitive mixtures devised according to one of the above-described principles, only at most one carboxyl group is formed or grafted onto the binder per quantum of light absorbed. Usually the quantum yield is still distinctly below 1. For this reason, all cases require long exposure times, but the solubility differentiation achieved is still poor in most cases. Of the photosensitive systems mentioned, therefore, only those which are based on the Wolff rearrangement of diazoketones have become established in the marketplace, and this only in the area of positive offset plates or positive resists for the fabrication of integrated circuits. In the case of other products, in particular photoresist films for circuitboard manufacture, the long exposure times required and the half-aqueous developers required on account of the lack of solubility differentiation are unacceptable. The problem of how to dispose of developers will become increasingly important in the future.

A fundamentally different way of increasing the solubility of a photosensitive layer by irradiation consists in selecting the composition of the layer in such a way that the average molecular weight of the binder decreases on irradiation. To this end, groups which are cleavable by actinic light are incorporated in the main chain of a polymer. Examples of such systems are polyoxymethylene polymers which contain acetal units formed from o-nitrobenzaldehyde or derivatives of o-nitrobenzaldehyde in the main chain. Such polymers and light-sensitive layers prepared therefrom are described for example in U.S. Pat. Nos. 3,991,033 and 4,189,611. In the same way it is also possible to incorporate acetals of o-nitrobenzaldehyde in the main chain of polymers which are essentially polyesters formed from a dicarboxylic acid and a difunctional alcohol (cf. U.S. Pat. No. 4,086,210). Other polymers which on irradiation react by cleaving the main chain and hence reducing the molecular weight are polymers which contain hexaarylbisimidazole units in their main chain (cf. U.S. Pat. No. 4,009,040).

A combination of main chain degradation and grafting with a carboxyl group is the principle exploited in EP-A-57 162 where unsaturated carboxylic acids are present as well as a polymer which contains benzoin units in the main chain. On irradiation, the benzoin units split and reduce the average molecular weight. At the same time the unsaturated carboxylic acids undergo addition to the free radicals formed at the cleavage sites and thus likewise increase the solubility in aqueous alkali.

Again, the positive-working photosensitive layers based on the main chain degradation of a suitable polymer according to one of the principles described above are not sufficiently sensitive to light. In addition, a postexposure thermal aftertreatment is necessary in many cases. For this reason, none of the systems described have become established in practice.

Attempts have therefore been made to utilize the high light sensitivity of photopolymerizable layers for the production of positive-working layers by forming an inhibitor of the polymerization by imagewise exposure through an original and then polymerizing the non-inhibited areas in a second, not necessarily imagewise exposure step. Examples of compounds proposed for the formation of polymerization inhibitors by irradiation are nitroso dimers (cf. DE-A-25 42 151) or certain o-nitroaromatics (cf. DE-A-27 10 417 and EP-A-103 197). These systems all require an additional exposure step, so that if anything the total process time is increased compared with other positive systems.

The hitherto most successful attempt at increasing the light sensitivity of positive-working light-sensitive layers has become known as chemical enhancement. Here, irradiation leads to the formation of a catalyst which in a second, thermal step, catalyzes a reaction which ultimately leads to an increase in the solubility of the photosensitive layer. The catalyst is usually a strong acid which is formed photochemically, for example, from an organic halogen compound, in particular a halogen-containing triazine compound (cf. for example DE-A-23 06 248), an aromatic nitro compound (cf. for example EP-A-78 981), a diazonium salt or an aromatic iodonium or sulfonium salt (cf. for example DE-A-36 20 677 and U.S. Pat. No. 4,491,628). The acid formed is used for splitting acid-labile bonds in the second, thermal step of the process. Depending on the acid-labile compound used, this splitting can lead either to the formation of a hydrophilic group from a hydrophobic group (cf. for example DE-A-36 20 677 and U.S. Pat. No. 4,491,628) or to a decrease in the molecular weight. Examples of acid-labile groups suitable for the last case are acetal (cf. DE-A-23 06 248, EP-A-78 981, EP-A-82 463 and U.S. Pat. No. 3,779,778), orthocarboxylic ester (cf. EP-A-78 981 and EP-A-82 463), enol ether (cf. EP-A-6 627 and EP-A-82 463), silyl ether (cf. DE-A-35 44 165 and EP-A-130 599) or silyl ester groups (cf. EP-A-130 599). Although these mixtures make it possible to achieve light sensitivities which in the best cases correspond to those of negative-working layers, products which are constructed according to the principle of chemical enhancement have become important only within the area of resists for fabrication of integrated circuits. In other fields, the additional thermal step required is not acceptable.

A further type of a positive-working light-sensitive mixture is described in EP-A-106 156. This mixture consists of a polycondensate having certain groups in the main chain and unsaturated groups at the end of the chain in combination with a photoinitiator. Groups mentioned for forming the main chain are aromatic hydrocarbon, diaryl ether, diaryl sulfide, diaryl sulfone, diarylamine, diaryl ketone and diaryl diketone groups. End groups are alkenyl groups or unsaturated carboxylic acid groups. The cause for the increase in the solubility on irradiation is suspected to be a chain degradation process induced by free radicals. Despite the very high initiator content of typically 25% by weight, only moderate light sensitivities are achieved.

The use of certain vinyl- and carboxyl-containing urethane compounds as raw materials in photoresist compositions is known per se. However, these are systems whose solubility decreases on exposure, i.e. negative-working systems.

For instance, DE-A-2 557 408 discloses vinyl- and carboxyl-containing urethane compounds obtained by reacting polyfunctional β-hydroxyalkylacryloyl compounds with an isocyanate, used in deficiency, and subsequent addition of the excess hydroxyl groups to a cyclic dicarboxylic anhydride.

Further unsaturated COOH-functionalized urethane compounds which are each only negative-developable are described in DE-A-2 917 483, DE-A-3 107 585 and WO 86/06730.

The cited examples show that in most areas there is still a demand for new positive-working light-sensitive mixtures which combine high light sensitivity and ease of handling, i.e. in particular the absence of additional operations.

It is an object of the present invention to develop a positive-working light-sensitive mixture having the properties mentioned and to devise its underlying reaction product.

We have found, surprisingly, that this object is achieved and that the solubility of certain ethylenically unsaturated reaction products which contain carboxyl groups and also urea and urethane groups increases on irradiation in the presence of compounds from which free radicals are formed on irradiation.

The present invention accordingly provides an ethylenically unsaturated reaction product which contains urea and urethane groups and also carboxyl groups obtained by reaction of i) at least one ethylenically monounsaturated or polyunsaturated mono- or polyalcohol with
ii) at least one di- or polyisocyanate,
iii) at least one amino compound of the general formula

R'HN—R—XH where
R is the divalent radical of a substituted or unsubstituted alkane, arene, ether, polyether, amine, polyamine, ester, polyester, amide or polyamide,
R' is hydrogen, alkyl, aryl, aralkyl, hydroxyalkyl, aminoalkyl, mercaptoalkyl, a derivative thereof or the monovalent radical H—[O—(CH$_2$)$_n$—CHR''—]$_m$ where n is from 1 to 3, m is from 1 to 10 and R'' is H or C$_1$–C$_4$-alkyl, or an isomer thereof,
X is O, S or NR''', R''' is hydrogen, alkyl, aryl, aralkyl, hydroxyalkyl, aminoalkyl, mercaptoalkyl or a derivative thereof, and/or
at least one amino compound of the general formula

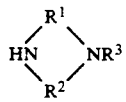

where
R$^1$ and R$^2$ are identical or different and each is the divalent radical of a substituted or unsubstituted alkane, arene, ether, polyether, amine, polyamine, ester, polyester, amide or polyamide,
R$^3$ is hydrogen, alkyl, aryl, aralkyl, hydroxyalkyl, aminoalkyl, mercaptoalkyl or a derivative thereof, and
iv) at least one anhydride of an at least dibasic carboxylic acid, with the proviso that the total number of NCO and anhydride groups in ii) and iv) is equal to or less than the number of groups in i) and iii) which are reactive therewith.

This olefinically unsaturated carboxyl- and also urethane- and urea group-containing reaction product is suitable for use as a raw material for radiation-sensitive materials. It is especially suitable for making films whose solubility in aqueous solutions increases on irradiation.

In particular embodiments of the present invention, the reaction product according to the present invention is prepared using as component i) an ethylenically monounsaturated mono- or polyalcohol, an ethylenically monounsaturated or polyunsaturated monoalcohol, an ethylenically monounsaturated monoalcohol, an α,β-ethylenically unsaturated carbonyl compound containing a hydroxyl group, a monohydroxyalkyl acrylate or methacrylate, as component ii) a diisocyanate, as component iii) one or more hydroxyalkylamines and as component iv) a cyclic carboxylic anhydride.

The present invention also provides three processes for preparing the reaction products according to the present invention, which comprise either reacting in a first stage one or more di- or polyisocyanates ii) with one or more ethylenically unsaturated mono- or polyalcohols i) and at the same time with at least one amino compound iii) to give a urethane-urea compound capable of reaction with anhydride groups, which is reacted in a second stage with at least one acid anhydride iv) to give an acid-functionalized urethane-urea compound; or reacting in a first stage one or more di- or polyisocyanates ii) with one or more ethylenically unsaturated mono- or polyalcohols i) to give a urethane compound which is substituted by isocyanate groups and which is reacted in a second stage with at least one amino compound iii) to give a urethane-urea compound capable of reaction with anhydride groups, which is reacted in a third stage with at least one acid anhydride iv) to give an acid-functionalized urethane-urea compound; or reacting in a first stage one or more di- or polyisocyanates ii) with at least one amino compound iii) to give a urea compound which is substituted by isocyanate groups and which is reacted in a second stage with one or more ethylenically unsaturated mono- or polyalcohols i) to give the urethane-urea compound capable of reaction with anhydride groups, which is reacted in a third stage with at least one acid anhydride iv) to give an acid-functionalized urethane-urea compound.

The present invention also provides radiation-sensitive materials formed from (a) an ethylenically unsaturated reaction product according to the present invention which contains urea, urethane and carboxyl groups, (b) an optional photoinitiator or photoinitiator system and (c) further optional additives and auxiliaries.

In these radiation-sensitive materials, the photoinitiator system (b) preferably comprises benzophenone or derivatives thereof, hexaarylbisimidazole derivatives, N-alkoxypyridinium salts or mixtures thereof.

The reaction product (a) according to the present invention is thus prepared by reacting the isocyanate component (ii) with the unsaturated alcohol component (i) and simultaneously or in stages with the amine component (iii) to give an unsaturated urethane-urea compound, preferably by using the groups which are reactive toward isocyanate in excess, preferably in a ratio of from 1.5:1 to 4:1.

This reaction can be carried out without a solvent or alternatively in an inert solvent, e.g. acetone, tetrahydrofuran, dioxane, dichloromethane, toluene, methyl ethyl ketone or ethyl acetate. Other suitable solvents are ethylenically monounsaturated or polyunsaturated compounds, if they are liquid.

The temperature for the reaction of the isocyanate groups is in general within the range from 0° to 100° C., preferably from 20° to 70° C.

To speed up the reaction it is possible to use catalysts as described for example in Houben-Weyl, Methoden der organischen Chemie, volume XIV/2, p. 60f, Georg Thieme Verlag, Stuttgart (1963) and Ullmann, Encyclopädie der technischen Chemie, volume 19, p. 306 (1981). Preference is given to tin-containing compounds, e.g. dibutyltin dilaurate, tin(II) octoate or dibutyltin dimethoxide.

In general, the catalyst is used in an amount of from 0.001 to 2.5% by weight, preferably from 0.005 to 1.5% by weight, based on the total amount of the reactants.

Stabilization is obtained by adding in general from 0.001 to 2% by weight, preferably from 0.005 to 1.0% by weight, of polymerization inhibitors. These are the usual compounds used for inhibiting thermal polymerization, for example compounds of the hydroquinone, the hydroquinone monoalkyl ether, the 2,6-di-t-butylphenol, the N-nitrosamine, the phenothiazine or the phosphorous ester type.

The products thus obtained are subsequently reacted with at least one anhydride compound iv) to give a carboxylic acid compound. For this reaction the groups which are reactive toward anhydride may be used in an equivalent amount or in excess. Preference is given to equivalence ratios of from 1:1 to 4:1. To speed up the reaction it is possible to add catalysts of the Lewis acid or Lewis base type in amounts of from 0.01 to 2% by weight. Preference is given to 4-(N,N-dimethylamino)-pyridine and N-methylimidazole. The reaction can be carried out within the range from 20° to 120° C. A solvent may be added if appropriate.

Especially if the reaction was carried out without a solvent, the product, which is solid or highly viscous at room temperature, may be diluted before cooling. In addition to the abovementioned solvents it is also possible after the reaction to use alcoholic diluents such as methanol, ethanol, isopropanol, etc.

There now follow detailed observations concerning the formative components for preparing the reaction products (a) according to the present invention and their use in radiation-sensitive mixtures.

The reaction of components i) to iv) is carried out using as ethylenically monounsaturated or polyunsaturated mono- or polyalcohols (i) hydroxyl-containing alpha,beta-unsaturated carbonyl compounds, allyl alcohols, hydroxy-functionalized allyl ethers and esters and hydroxyalkyl vinyl ethers; particular preference is given to hydroxyalkyl acrylates and methacrylates having from 2 to 4 carbon atoms in the alkyl group, which alkyl groups may be linear or branched and carry further substituents, e.g. hydroxyethyl acrylate, hydroxyethyl methacrylate, hydroxypropyl acrylate, hydroxypropyl methacrylate, butanediol monoacrylate and butanediol monomethacrylate.

A suitable isocyanate component ii) is any compound which contains at least two isocyanate groups capable of reaction with alcohols or primary or secondary amines. Particular preference is given to diisocyanatodiphenylmethane, diisocyanatotoluene (=toluylene diisocyanate), hexamethylene diisocyanate and isophorone diisocyanate and also to oligomers thereof of the isocyanurate and biuret type.

Suitable amino compounds iii) are those of the general formulae

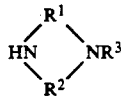

where in the general formula

R'HN—R—XH

R is a divalent radical of a substituted or unsubstituted alkane, for example of from 2 to 10 carbon atoms, such as—$(CH_2)_p$—where p is from 2 to 10, —$CH_2$—$C(CH_3)_2$—$CH_2$—or —$CH(CH_3)$—$CH_2$—, of an arene, for example phenylene, of a substituted arene, for example—$(CH_2)_r$—$C_6H_3(OH)$—where r is from 1 to 6, preferably 2, of an ether, for example —$(CH_2$—$CHR^{IV}$—$O)_q$—$CH_2$=$CHR^{IV}$—where q is from 1 to 5, and $R^{IV}$ is H or alkyl of from 1 to 4 carbon atoms, of an amine, for example of from 2 to 20 carbon atoms, e.g. —(CH$_2$)$_3$—N(CH$_3$)—(CH$_2$)$_3$—, of a polyamine, for example —(CH$_2$—CH$_2$—NH)$_o$—where o is from 2 to 5, of an ester, for example of from 4 to 20 carbon atoms, e.g. —(CH$_2$)$_2$—COO—(CH$_2$)$_s$—where s is from 2 to 6, —CH$_2$—COO—CH$_2$—CH(CH$_3$)—, or of an amide, for example of from 4 to 20 carbon atoms, e.g.—(CH$_2$)$_2$—CONH—CH$_2$—or —(CH$_2$)$_2$—CONH—(CH$_2$)$_5$—NHOC—(CH$_2$)$_2$—;

R' is hydrogen, alkyl, for example of from 1 to 30, preferably from 1 to 10, carbon atoms, e.g. methyl, ethyl, propyl, butyl and isomers thereof, cyclohexyl, aryl, for example of from 6 to 18 carbon atoms, preferably phenyl, aralkyl, for example of from 7 to 20 carbon atoms, e.g. benzyl, 1-methyl-3-phenylpropyl, 1-phenylethyl, hydroxyalkyl, for example of from 2 to 10 carbon atoms, e.g. hydroxyethyl, hydroxypropyl, hydroxybutyl, aminoalkyl, for example of from 2 to 10 carbon atoms, e.g. aminoethyl, aminopropyl, dimethylaminobutyl, dimethylaminoneopentyl, mercaptoalkyl, for example of from 2 to 10 carbon atoms, e.g. mercaptoethyl, or derivatives of these groups—derivatives being in the present case alkyl-, halogen-, nitro-, nitrile-, carboxyl-, ester-, acyl-, OH-, amino-, sulfo- or diazo-substituted groups of the aforementioned kind —or the monovalent radical H$+$O—(CH$_2$)$_n$—CHR"$+_m$ where n is from 1 to 3, m is from 1 to 10 and R" is H or C$_1$-C$_4$alkyl, or isomers thereof as obtainable by simple addition or polyaddition of cyclic ethers, e.g. ethylene oxide, propylene oxide or tetrahydrofuran, for example hydroxyethyloxyethyl;

X is O, S or NR"', where R"' is hydrogen, alkyl, for example of from 1 to 10 carbon atoms, e.g. methyl or ethyl, aryl, for example phenyl or naphthyl, aralkyl, for example benzyl or phenylethyl, hydroxyalkyl, aminoalkyl or mercaptoalkyl, with alkyl groups which may each contain from 1 to 10 carbon atoms, or derivatives of these groups of the type mentioned under R'.

Examples of compounds of the general formula R'HN—R—XH are ethylenediamine, butanediamine, neopentanediamine, polyoxypropylenediamines, polyoxyethylenediamines,N-ethylethylenediamine,diethylenetriamine, monoisopropanolamine. Particular preference is given to ethanolamine, diethanolamine, diisopropanolamine, neopentanolamine, ethylisopropanolamine, butylethanolamine and 2-mercaptoethylamine.

In the general formula

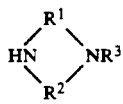

R$^1$ and R$^2$ are identical or different and each is, in particular, the divalent radical of a substituted or unsubstituted alkane, for example of from 2 to 4 carbon atoms, e.g.—(CH$_2$)$_t$—where t is from 1 to 4, of an arene, for example o-phenylene, or an ether, for example of from 2 to 4 carbon atoms, e.g.—CH$_2$—O—CH$_2$—;

R$^3$ is hydrogen, alkyl, aryl, aralkyl, hydroxyalkyl, aminoalkyl, mercaptoalkyl or a derivative thereof of the type mentioned under R'. Preferred compounds of the general formula

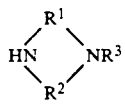

are piperazine and 1-(2-hydroxyethyl)piperazine.

Similarly, it is also possible to use mixtures of the amino compounds mentioned under iii).

Suitable acid anhydrides iv) are the anhydrides of all compounds which contain at least two carboxylic acid groups. Particular preference is given to cyclic carboxylic anhydrides, e.g. phthalic anhydride, maleic anhydride, trimellitic anhydride, pyromellitic anhydride and the anhydride of benzophenonetetracarboxylic acid.

The compounds i) to iv) used for preparing the reaction product according to the present invention are adapted to one another in such a way that the resulting materials according to the present invention are insoluble in water or aqueous alkali. The reaction products according to the present invention can have acid numbers up to 300, preferably from 10 to 200, mg of KOH/g. The molecular weight is chosen in such a way as to produce good film forming properties.

(b) The photoinitiators which may be included in the radiation-sensitive material according to the present invention are the photoinitiators and photoinitiator systems which are customary and known per se for light-sensitive photopolymerizable recording materials. Specific examples are: benzoin, benzoin ethers, in particular benzoin alkyl ethers, substituted benzoins, alkyl ethers of substituted benzoins, e.g. α-methyl-benzoin alkyl ethers, or α-hydroxymethylbenzoin alkyl ethers; benzils, benzil ketals, in particular benzil dimethyl ketal, benzil methyl ethyl ketal or benzil methyl benzyl ketal; the acylphosphine oxide compounds known for use as effective photoinitiators, e.g. 2,4,6-trimethylbenzoyl-diarylphosphine oxide; benzophenone, derivatives of benzophenone,4,4'-dimethylaminobenzophenone,-derivatives of Michler's ketone; anthraquinone and substituted anthraquinones; aryl-substituted imidazoles or derivatives thereof, e.g. 2,4,5-triarylimidazole dimers; thioxanthone derivatives, the active photoinitiator acridine or phenacine derivatives and N-alkoxypyridinium salts and derivatives thereof. Suitable photoinitiators also include diazonium salts, e.g. p-phenylaminobenzenediazonium hexafluorophosphate, iodonium salts, e.g. diphenyliodonium tetrafluoroborate, or sulfonium salts, e.g. triphenylsulfonium hexafluoroarsenate. Examples of initiator systems are combinations of the aforementioned initiators with sensitizing assistants or activators, in particular tertiary amines. Typical examples of such initiator systems are combinations of benzophenone or benzophenone derivatives with tertiary amines, such as triethanolamine or Michler's ketone; or mixtures of 2,4,5-triarylimidazole dimers and Michler's ketone or the leuco bases of triphenylmethane dyes. The choice of suitable photoinitiators or photoinitiator systems is known to the skilled worker. Particularly preferred photoinitiators are Michler's ketone, benzophenone, hexaarylbisimidazole derivatives and N-alkoxypyridinium salts. Mixtures of said photoinitiators are also very suitable. The photoinitiators or photoinitiator systems are in general present in the light-sensitive recording layer in amounts of from 0.1 to 10% by weight, based on the radiation-sensitive material.

Particularly preferred photoinitiators are Michler's ketone, benzophenone, hexaarylbisimidazole derivatives and N-alkoxypyridinium salts. Mixtures of said photoinitiators are also very suitable.

(c) Suitable additives and/or auxiliaries (c) for possible inclusion in the radiation-sensitive mixture according to the present invention include for example dyes and/or pigments, photochromic compounds and systems, sensitometric regulators, plasticizers, flow control agents, delusterants, lubricants, basic components and the like. Examples of dyes and/or pigments, which may serve not only as contrast agents but also to reinforce the layer, include inter alia Brilliant Green (C.I. 42 040), Victoria Pure Blue FGA, Victoria Pure Blue 80 (C.I. 42 595), Victoria Blue B (C.I. 44 045), Rhodamine 6 G (C.I. 45 160), triphenylmethane dyes, naphthalimide dyes and 3'-phenyl-7-dimethylamino-2,2'-spirodi(2H-1benzopyran). Photochromic or color change systems which on irradiation with actinic light undergo a reversible or irreversible color change without thereby interfering with the photopolymerization process are for example leuco dyes together with suitable activators. Examples of leuco dyes are the leuco bases of triphenylmethane dyes, such as crystal violet leuco base and malachite green leuco base, leuco Basic Blue, leuco pararosaniline, leuco Patent Blue A or V; it is also possible to use Rhodamine B base. Suitable activators for these photochromic compounds include inter alia organic halogen compounds which eliminate the halogen radicals on irradiation with actinic light or hexaarylbisimidazoles. Suitable color change systems are also described in DE-A-38 24 551. Particularly suitable color change systems are those where the color intensity decreases on irradiation, for example Sudan dyes, polymethine dyes or azo dyes combined with suitable photoinitiators. Suitable sensitometric regulators include compounds such as 9-nitroanthracene, 10,10'-bisanthrone, phenazinium, phenoxazinium, acridinium or phenothiazinium dyes, in particular combined with mild reducing agents, 1,3-dinitrobenzenes and the like. Suitable plasticizers are the known and customary low or high molecular weight esters, such as phthalates or adipates, toluenesulfonamide or tricresyl phosphate. Suitable basic components are additions of amines, in particular tertiary amines, e.g. triethylamine or triethanolamine, or alkali metal or alkaline earth metal hydroxides and carbonates. The additives and/or assistants are present in the radiation-sensitive material in the effective amounts known and customary for these substances. However, their amount should in general not exceed 30% by weight, preferably 20% by weight, based on the radiation-sensitive material.

In many cases it has proved advisable to add to the radiation-sensitive materials according to the present invention acidic polymers such as partially esterified styrene/maleic anhydride copolymers, copolymers of styrene, methyl methacrylate, ethyl acrylate and methacrylic acid or copolymers of methyl methacrylate, ethylhexyl acrylate and acrylic acid or methacrylic acid. Such acidic polymers are preferably added to the radiation-sensitive material in a concentration of 1-40% by weight, particularly preferably in a concentration of 5-30% by weight, based on the total weight of the radiation-sensitive material.

The radiation-sensitive materials according to the present invention may additionally contain one or more ethylenically monounsaturated or polyunsaturated compounds. Ethylenically unsaturated compounds particularly suitable for this purpose are acrylates and methacrylates, e.g. trimethylolpropane triacrylate or tripropylene glycol diacrylate. The ethylenically unsaturated compounds are preferably added to the radiation-sensitive material in a concentration of 1-20% by weight, particularly preferably in a concentration of 3-10% by weight, based on the total weight of the radiation-sensitive material. An addition of ethylenically unsaturated compounds will be made in particular when after a first imagewise exposure step and the removal of the irradiated material in a developer a crosslinking reaction is brought about in a second, longer exposure step in order thus to improve the mechanical stability, for example of printing plates.

A film or coating can be prepared by dissolving the above-described compounds in a solvent and then applying the resulting solution to a permanent or temporary support by casting, with or without a doctor blade, spin coating, roller coating or some other technique.

Suitable solvents are for example aromatic hydrocarbons, low molecular weight ketones, alcohols, ethers, esters and chlorocarbons.

A suitable support for the radiation-sensitive coatings according to the present invention is virtually any material which is customary in printing and in the fabrication of circuit boards for the electronics industry. However, an important condition is that the support be inert, i.e. that it should not react with the radiation-sensitive mixture used for preparing the coating.

Suitable support materials are for example steel, aluminum alloys, mechanically, chemically or electrochemically roughened aluminum, silicon, polyesters and other plastics. The layer thickness here may vary within wide limits. If the radiation-sensitive material is used for example as a letterpress or intaglio printing plate, it will typically be within the range from 50 to 500 $\mu$m, if used as a photoresist for the fabrication of printed circuits within the range from 20 to 100 $\mu$m and if used as a photoresist for structuring semiconductor materials within the range from 0.3 to 5 $\mu$m. If the radiation-sensitive material according to the present invention is used as an offset printing plate, the coating will be prepared in such a way as to produce dry layer weights of from 0.5 to 5 g/sqm.

The radiation-sensitive materials according to the present invention are advantageous for producing printing plates or resist patterns in a conventional manner. To this end the light-sensitive recording layer—in the case of photoresist films and laminating materials after lamination to the substrate to be protected—is subjected to imagewise exposure with actinic light, suitable sources of which are the customary ones, such as UV fluorescent tubes, mercury high, medium or low pressure lamps, superactinic fluorescent tubes, pulsed xenon lamps or even UV lasers, argon lasers and the like. The wavelength emitted by the light sources should in general be within the range from 230 to 450 nm, preferably within the range from 300 to 420 nm, and be adapted in particular to the characteristic absorption of the photoinitiator present in the photopolymerizable recording layer.

Following imagewise exposure, the printing plate or resist pattern is developed by washing out the irradiated areas of the recording layer with water or preferably an aqueous alkali. The process of development can take the form of washing, spraying, rubbing, brushing etc. The recording elements according to the present invention here show a wide development latitude and a very low overwash sensitivity. Suitable developers are aqueous alkalis which to set the best pH, in general pH 8-14, preferably a pH within the range from 9 to 13, contain alkaline substances, for example borax, disodium hydrogenphosphate, sodium carbonate, alkali metal hydroxides or organic bases, such as di- or triethanolamine, dissolved in water. The aqueous alkali developers may also contain buffer salts, for example water-soluble alkali metal phosphates, silicates, borates, acetates or benzoates. Further suitable constituents of developers are wetting agents, preferably anionic wetting agents, and possibly water-soluble polymers, for example sodium carboxymethylcellulose, polyvinyl alcohol, polysodium acrylate and the like. Although the recording elements according to the present invention are in general washed out with water or aqueous alkali, it is of course possible in principle, although not strictly necessary, that the developer should also contain a small amount of water-soluble organic solvent, for example an aliphatic alcohol, acetone or tetrahydrofuran.

The radiation-sensitive materials according to the present invention can be structured for example by high-energy radiation such as electron beams or X-rays, when they show their very high sensitivity to radiation. If used in this way it is generally possible to dispense with the addition of a separate initiator system. If, by contrast, the materials according to the present invention are to be structured by visible or UV light, as is customary for the production of printing plates and photoresists, it is advisable to add suitable photoinitiators whose spectral sensitivity matches the emitted spectrum of the light source used. These mixtures likewise show a very high light sensitivity for positive-working systems, which corresponds to the light sensitivity of commercial negative systems of similar thickness. This high light sensitivity is obtained without any need for additional operations, for example the thermal aftertreatment which is necessary with many other positive systems. Similarly, the developers used correspond to those used for negative-working layers, so that the recording layers according to the present invention are completely compatible with conventional systems. The radiation-sensitive recording layers according to the present invention are highly suitable for multiple exposures. This makes it possible in many applications to save process steps. Multiple exposures are not possible with all photopolymerizable systems, including many positive systems, for fundamental reasons. The radiation-sensitive materials according to the present invention also have the interesting property of acting as positive systems for short exposure times but as crosslinkable systems for long exposure times. This effect can be enhanced as described by addition of ethylenically unsaturated polymerizable compounds. This property can be utilized after a first, imagewise exposure step with a short exposure time and after removal of the irradiated areas in a developer for initiating a crosslinking reaction in a second, not necessarily imagewise exposure step using a distinctly longer exposure time. In this way it is possible to improve the mechanical properties, for example of printing plates.

The invention is illustrated in more detail by the Examples which follow.

In the method of preparation and in the Examples, the percentages are by weight, unless otherwise stated. Preparation of the reaction products according to the present invention.

Method of preparation 1

174.2 g of hydroxyethyl acrylate (1.5 mol) are added dropwise at 20°-29° C. to a mixture of 333 g of isophorone diisocyanate (1.5 mol), 0.1 g of dibutyltin dilaurate, 0.8 g of 2,6-di-tert-butyl-4-methylphenol and 218 g of methyl ethyl ketone with stirring in the course of 30 minutes. After 1.5 hours' reaction, in which the temperature rises to 47° C., the NCO content is 8.71%. A solution of 179.8 g of diisopropanolamine (1.35 mol) in 77.1 g of methyl ethyl ketone is added dropwise with ice-cooling at 25°-28° C. in the course of 20 minutes. After further stirring at 50° C. for about 3 hours, 222.1 g of phthalic anhydride (1.5 mol), 95.2 g of methyl ethyl ketone and 4.5 g of N-methylimidazole are added, and the reaction is continued at 80° C. for 5 hours. The 75% strength solution of the product has a viscosity of 6.48 mPa.s (23° C., plate/cone viscometer). The solvent-free product has an acid number of 91.7 mg of KOH/g.

Method of preparation 2

Method of preparation 1 is followed to react 250 g of diisocyanatodiphenylmethane (1 mol) and 0.1 g of dibutyltin dilaurate in 244 g of ethyl acetate with a solution of 116.1 g of hydroxyethyl acrylate (1 mol), 0.8 g of 2,6-di-tert-butyl-4-methylphenol and 2 g of tris(N-cyclohexyldiazeniumdioxy)aluminum (30% strength in Solvesso® 100/Shell) and also 133.2 g of diisopropanolamine (1 mol) and dissolved in 110 g of ethyl acetate. Reaction with 98.1 g of maleic anhydride (1 mol) and 2.5 g of N-methylimidazole gives a 64.5% strength solution having a viscosity of 1.04 mPa.s (23° C., plate/cone viscometer). The solvent-free product has an acid number of 90.2 mg of KOH/g.

Method of preparation 3

Method of preparation 1 is followed to react 261.2 g of toluylene diisocyanate (1.5 mol), 0.1 g of dibutyltin dilaurate, 0.8 g of 2,6-di-tert-butyl-4-methylphenol and 3.1 g of tris(N-cyclohexyldiazeniumdioxy)aluminum (30% strength in Solvesso® 100/Shell) in 187 g of methyl ethyl ketone with 174.2 g of hydroxyethyl acrylate (1.5 mol) and also 199.8 g of diisopropanolamine (1.5 mol) dissolved in 86 ml of methyl ethyl ketone. Reaction with 222.1 g of phthalic anhydride (1.5 mol) and 4.3 g of N-methylimidazole gives a 74% strength solution having a viscosity of 4.96 Pa.s (23° C., plate/cone viscometer). The solvent-free product has an acid number of 89.2 mg of KOH/g.

Use in radiation-sensitive materials.

EXAMPLE 1

10 g of the reaction product prepared in accordance with method of preparation 1, 700 mg of N-methoxypicolinium tosylate and 15 mg of Michler's ketone were dissolved in 8 g of methyl ethyl ketone and cast onto a 3 μm thick sheet of polyethylene terephthalate in such a way that, after drying, the photosensitive layer had a thickness of 40 μm. The layer was covered for storage with a 30 μm thick sheet of PE. To test the layer, the sheet of PE was peeled off, the composite of polyethylene terephthalate film and photosensitive layer was laminated with the photosensitive layer next to the copper onto a copper-clad circuit board substrate and irradiated in a Riston® PC printer at 50 mJ/cm². After the polyethylene terephthalate film had been peeled off, the layer was developed in a spray washer with 1% strength sodium carbonate solution at 30° C.

for 15 seconds, the irradiated areas of the light-sensitive layer proving completely removable. The non-irradiated layers remained unchanged.

EXAMPLE 2

As in Example 1, 10 g of the product obtained in accordance with method of preparation 1 were dissolved in 8 g of methyl ethyl ketone and admixed with 300 mg of benzophenone and 15 mg of Michler's ketone. The solution was used in the same way as in Example 1 to cast layers 40 μm in thickness. The layers were laminated onto copper-clad circuitboard substrates and irradiated in a Riston PC printer at 100 mJ/cm². The irradiated areas were removable with 1% strength sodium carbonate solution in the course of 30 seconds without leaving residues on the copper.

EXAMPLE 3

Similarly, 10 g of the compound prepared by method of preparation 1 were admixed in 8 g of methyl ethyl ketone with 200 mg of 2,2,-bis(o-chlorophenyl-4,4',5,5'-tetra(p-methoxyphenyl)bisimidazolyl. The solution obtained was processed as in Example 1. Following exposure in a Riston PC printer at 100 mJ/cm² the irradiated areas were removable in 1% strength sodium carbonate solution in the course of 15 seconds.

EXAMPLE 4

10 g of the product obtained by method of preparation 2 were dissolved in 8 g of methyl ethyl ketone and admixed with 700 mg of N-methoxypicolinium tosylate and 15 mg of Michler's ketone. The further processing and testing were carried out as in Example 1. Following exposure to 70 mJ/cm² the development time required in 1% strength sodium carbonate solution was 25 seconds.

EXAMPLE 5

47 g of the compound obtained by method of preparation 3 were dissolved in 35 g of methyl ethyl ketone and admixed with 75 mg of Michler's ketone, 1.5 g of benzophenone and 1.5 g of N-methoxypicolinium tosylate. The solution obtained was processed and tested as in Example 1. Following exposure at 150 mJ/cm² the irradiated areas were removable in 1% strength sodium carbonate solution in the course of 30 seconds.

EXAMPLE 6

10 g of the reaction product prepared by method of preparation 1 were dissolved in 8 g of methyl ethyl ketone, and the solution was cast onto a copper-clad circuitboard substrate in such a way as to produce a radiation-sensitive layer 30 μm in thickness. The layer was irradiated at 0.15 MRad in an electron beam unit from Energy Science, Woburn, USA, model CB 150/15/10 and then treated with 1% strength sodium carbonate solution. The irradiated layer dissolved within 25 seconds, whereas a non-irradiated comparison sample did not show any change even following a development time of 300 seconds.

EXAMPLE 7

10 g of the reaction product obtained by method of preparation 1, 530 mg of N-methoxypicolinium tosylate and 25 mg of Michler's ketone were dissolved in a mixture of 45 g of propylene glycol monomethyl ether and 45 g of acetone, and the solution was cast onto a 30 μm thick sheet of aluminum having an electrochemically roughened oxide surface in such a way that, after drying, the photosensitive layer had a weight of 2.1 g/m². The plate thus produced was covered with protective paper and stored away from light until required for testing. To test the plate, the protective paper was removed from the plate and the radiation-sensitive layer was exposed in a commercial offset exposure unit (5.5 kW) for 50 cycles, then developed with 1.5% strength sodium carbonate solution for 60 seconds and subsequently rinsed with water. This treatment served to remove all of the irradiated areas of the layer while leaving the non-irradiated areas unaffected.

EXAMPLE 8

10 g of of the reaction product prepared by method of preparation 1, 300 mg of ethyl dimethylaminobenzoate and 80 mg of isopropylthioxanthone were dissolved in 8 g of methyl ethyl ketone, and the solution was cast into a layer 40 μm in thickness as in Example 1. This layer was laminated onto a copper-clad circuitboard substrate and subjected to imagewise exposure through a transparency at 50 mJ/cm². After the polyethylene terephthalate film had been peeled off, the layer was treated with 1% strength sodium carbonate solution for 30 seconds, which had the effect of removing the irradiated areas of the layer. The layer was then dried at 85° C. for 10 minutes and, after cooling, subjected again to an imagewise exposure at 50 mJ/cm² through another transparency. The areas irradiated in the second exposure step were then likewise removed with 1% strength sodium carbonate solution.

EXAMPLE 9

9 g of the reaction product prepared by method of preparation 1, 1 g of tripropylene glycol diacrylate, 300 mg of ethyl dimethylaminobenzoate and 80 mg of isopropylthioxanthone were dissolved in 8 g of methyl ethyl ketone, and the solution was cast into a 40 μm thick layer as in Example 1. This layer was laminated onto a copper-clad circuitboard substrate and subjected to imagewise exposure through a transparency at 50 mJ/cm². After the polyethylene terephthalate sheet had been peeled off, the layer was treated with 1% strength sodium carbonate solution for 30 seconds, which had the effect of removing the irradiated areas of the layer. The layer was then dried at 85° C. for 10 minutes and, after cooling, subjected to a uniform exposure at 1,000 mJ/cm². Thereafter the layer showed significantly greater hardness and elasticity than in the non-irradiated state. Nor was it any longer possible to remove the layer with 1% strength sodium carbonate solution.

We claim:

1. An ethylenically unsaturated reaction product which contains urea and urethane groups and also carboxyl groups, obtained by reaction of
   i) at least one ethylenically monounsaturated or polyunsaturated mono- or polyalcohol with
   ii) at least one di- or polyisocyanate,
   iii) at least one amino compound of the formula

R'HN—R—XH where
   R is the divalent radical of an alkane, arene, ether, amine, ester, or amide, R' is hydrogen, alkyl, aryl, aralkyl, hydroxyalkyl, aminoalkyl, mercaptoalkyl, or the monovalent radical

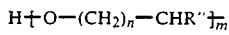

where n is from 1 to 3, m is from 1 to 10 and R″ is H or $C_1$-$C_4$-alkyl,

X is O, S or NR‴.

R‴ is hydrogen, alkyl, aryl, aralykl, hydroxyalkyl, aminoalkyl, or mercaptoalkyl, and/or at least one amino compound of the formula

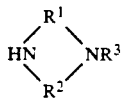

where $R^1$ and $R^2$ are identical or different and each is the divalent radical of an alkane, arene, ether, amine, ester, or amide, $R^3$ is hydrogen, alkyl, aryl, aralykl, hydroxyalkyl, aminoalkyl or mercaptoalkyl, and iv) at least one anhydride of an at least dibasic carboxylic acid, with the proviso that the total number of NCO and anhydride groups in ii) and iv) is equal to or less than the number of groups in i) and iii) which are reactive therewith.

2. A reaction product as defined in claim 1, wherein component i) is an ethylenically monounsaturated mono- or polyalcohol.

3. A reaction product as defined in claim 1, wherein component i) is an ethylenically monounsaturated or polyunsaturated monoalcohol.

4. A reaction product as defined in claim 1, wherein component i) is an ethylenically monounsaturated monoalcohol.

5. A reaction product as defined in claim 1, wherein component i) is an α,β-ethylenically unsaturated carbonyl compound containing a hydroxyl group.

6. A reaction product as defined in claim 1, wherein component i) is a monohydroxyalkyl acrylate or methacrylate.

7. A reaction product as defined in claim 1, wherein component ii) is a diisocyanate.

8. A reaction product as defined in claim 1, wherein component iii) comprises one or more hydroxyalkylamines.

9. A reaction product as defined in claim 1, wherein component iv) is a cyclic carboxylic anhydride.

10. A radiation-sensitive material formed from
(a) an ethylenically unsaturated reaction product containing urea and urethane groups and also carboxyl groups,
(b) an optional photoinitiator or photoinitiator system and
(c) optional additives and auxiliaries, wherein component (a) is a reaction product as claimed in claim 1.

11. A radiation-sensitive material as defined in claim 10, wherein the photoinitiator system (b) comprises benzophenone or a derivative thereof, hexaarylbisimidazole derivatives, N-alkoxypyridinium salts or mixtures thereof.

12. A radiation-sensitive material as defined in claim 11, whose solubility in water or aqueous alkali increases on irradiation.

13. A radiation-sensitive material as defined in claim 11, whose solubility in water or aqueous alkali increases on irradiation.

14. A radiation-sensitive material as defined in claim 10, whose solubility in water or aqueous alkali increases on irradiation.

15. A reaction product as defined in claim 1, wherein R is a polyether.

16. A reaction product as defined in claim 1, wherein R is a polyamine.

17. A reaction product as defined in claim 1, wherein R is a polyester.

18. A reaction product as defined in claim 1, wherein R is a polyamide.

19. A reaction product as defined in claim 1, wherein $R^1$ and/or $R^2$ is a polyether.

20. A reaction product as defined in claim 1, wherein $R^1$ and/or $R^2$ is a polyamine.

21. A reaction product as defined in claim 1, wherein $R^1$ and/or $R^2$ is a polyester.

22. A reaction product as defined in claim 1, wherein $R^1$ and/or $R^2$ is a polyamide.

* * * * *